No. 654,416. Patented July 24, 1900.
E. E. RUEF.
BEARING.
(Application filed Jan. 11, 1900.)
(No Model.) 2 Sheets—Sheet 1.
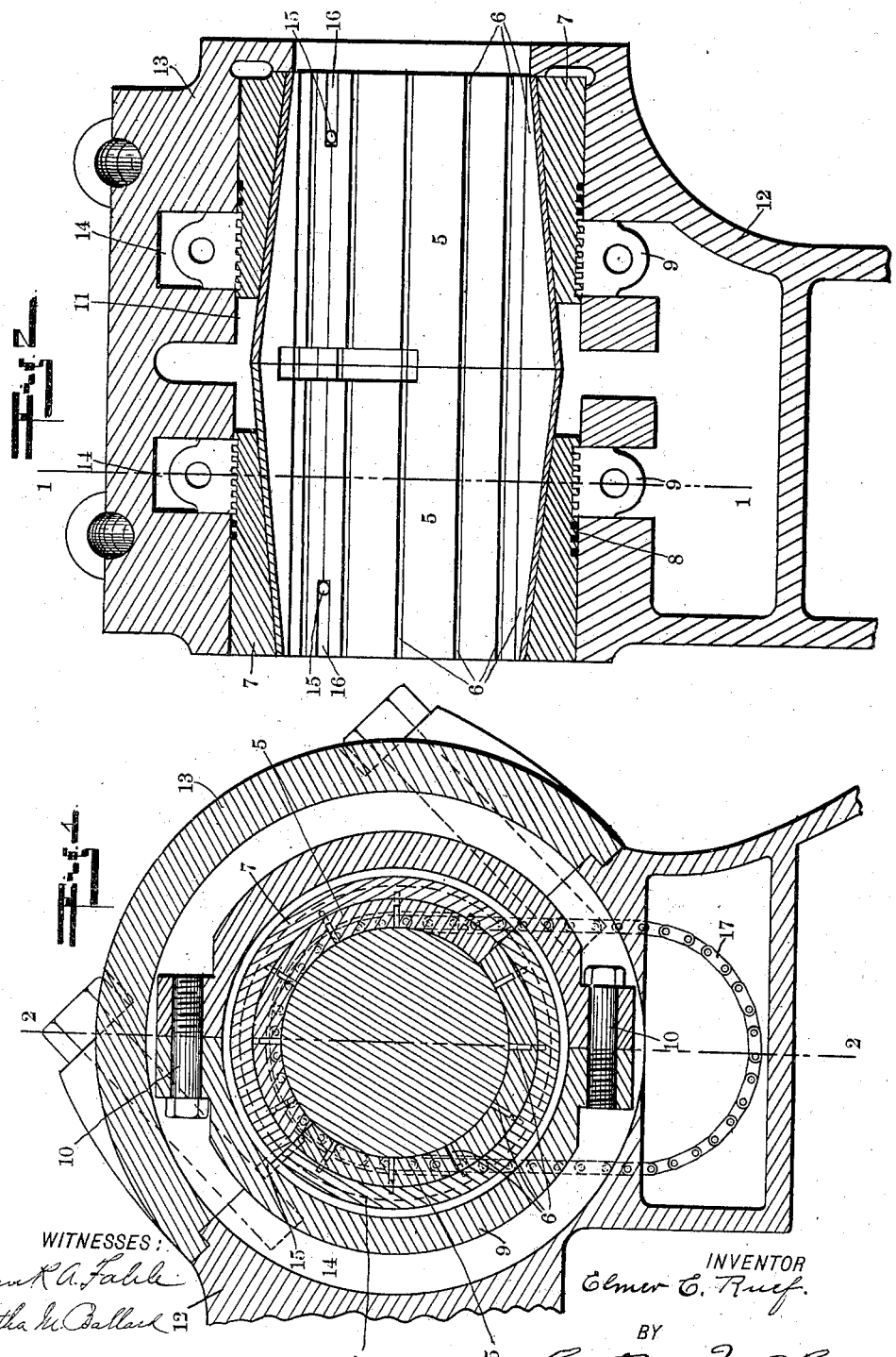
WITNESSES:
Frank A. Fable
Bertha M. Ballard
INVENTOR
Elmer E. Ruef.
BY
Arthur M. Hood
ATTORNEY.
THE NORRIS PETERS CO., PHOTO-LITHO., WASHINGTON, D. C.

No. 654,416.  
E. E. RUEF.  
BEARING.  
(Application filed Jan. 11, 1900.)  
Patented July 24, 1900.
(No Model.)
2 Sheets—Sheet 2.
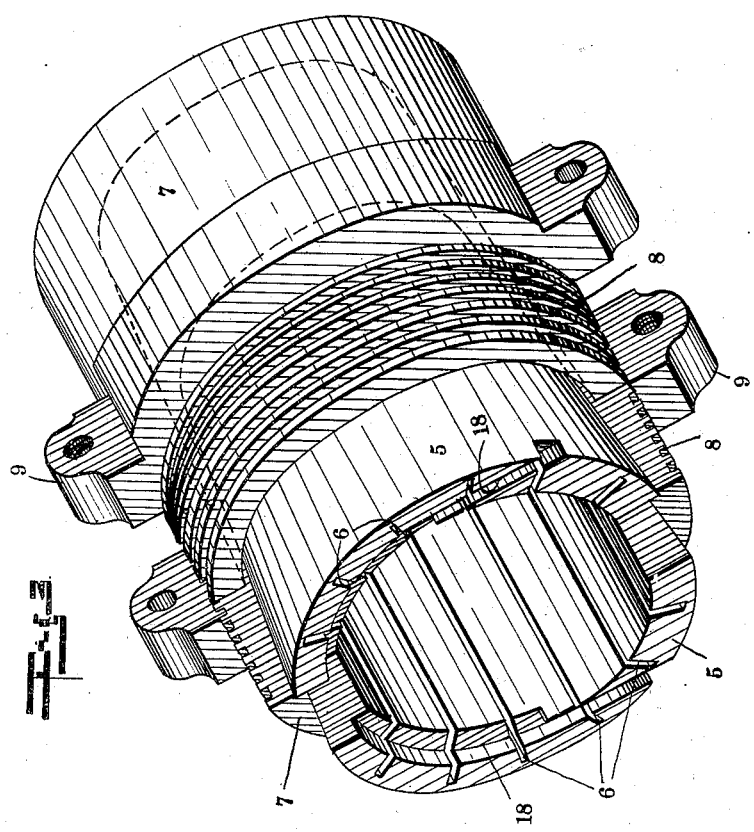
WITNESSES:
INVENTOR
BY
ATTORNEY.

UNITED STATES PATENT OFFICE.

ELMER E. RUEF, OF INDIANAPOLIS, INDIANA, ASSIGNOR TO THE CHANDLER & TAYLOR COMPANY, OF SAME PLACE.

BEARING.

SPECIFICATION forming part of Letters Patent No. 654,416, dated July 24, 1900.

Application filed January 11, 1900. Serial No. 1,096. (No model.)

*To all whom it may concern:*

Be it known that I, ELMER E. RUEF, a citizen of the United States, residing at Indianapolis, in the county of Marion and State of Indiana, have invented a new and useful Bearing, of which the following is a specification.

My invention relates to an improvement in shaft-bearings.

The object of my invention is to produce a bearing provided with wearing-bushings of such form that the shaft-opening therethrough may be adjusted uniformly about its center.

The accompanying drawings illustrate my invention.

Figure 1 is a transverse section on line 1 1 of Fig. 2. Fig. 2 is a longitudinal section on line 2 2 of Fig. 1 with the shaft removed. Fig. 3 is a perspective view of the parts slightly separated.

In the drawings, 5 indicates a cylindrical bushing of suitable material—such as babbitt, phosphor-bronze, &c. Said bushing is tapered axially upon its periphery and is preferably formed of two semicylindrical sections. Extending outward from the inner face of each of said bushing-sections is a series of radial cuts or grooves 6, which extend almost to the tapered periphery. In practice these grooves will be cast into the bushing. Mounted upon bushing 5 is a cylindrical sleeve 7, preferably formed of two semicylindrical portions. The sleeve 7 is somewhat shorter than bushing 5 and its interior is tapered, so as to fit the tapered exterior of the bushing. The periphery of sleeve 7 is parallel with the axis and is provided with threads 8, upon which is mounted a nut 9. Nut 9 is preferably formed of two halves secured together by means of suitable bolts 10. The outer diameter of sleeve 7 is such as to fit neatly within the bore 11, formed in the usual manner in standard 12 and cap 13. Formed in standard 12 and cap 13 is an annular groove 14, arranged to receive nut 9, so as to prevent any axial movement thereof, but so as to allow a rotation of said nut. A pin 15 (shown in dotted lines in Fig. 1) projects into bore 11, a small portion of the adjacent ends of the halves of the bushing and sleeve being removed to receive said pin, as shown at 16.

In the drawings I have shown my bearing as applied to a crank-shaft of a steam-engine and have duplicated the several parts already described, placing the larger ends of the bushings 5 together, as clearly shown in Fig. 2. It will be readily understood, however, that the bearing is complete without this duplication.

The bearing may be provided with any desired form of self-oiler, such as the chain 17, by forming a suitable channel 18 therefor in the adjacent ends of bushings 5. Any wear or enlargement of the bore of bushing 5 may be taken up by turning nut 9 so as to force sleeve 7 onto the bushing. This movement, owing to the grooves 6, extending from the interior of said bushing, will compress the bushing uniformly about the center, thus maintaining the concentricity of the bearing and bringing all of the portions of the inner face of the bushing uniformly into contact with the shaft. The bushing-halves and sleeve-halves are preferably arranged in alinement, with the parting between the standard and cap, so that the several portions of the bearing may be easily removed and a new bushing inserted. In order to remove the bushings, cap 13 and bolts 10 are removed and nut 9 turned so as to bring its halves in alinement with the other parts and the shaft jacked up enough to lift its weight from the lower bushing. The upper halves of the nut 9, sleeve 7, and bushing 5 may be lifted off of the shaft and then the lower halves of said parts turned from beneath the shaft in the order named.

I claim as my invention—

1. In a bearing, a compressible bushing arranged to receive a shaft and tapered upon its periphery, a sleeve tapered internally and adapted to receive said bushing and having threads formed upon its periphery, a nut adapted to engage said threads, and means for preventing axial movement of said nut.

2. In a bearing, a cylindrical bushing tapered upon its periphery and adapted to receive a shaft, said bushing having a series of longitudinal grooves extending from the interior toward its periphery, an internally-tapered sleeve adapted to receive said bushing and having threads formed upon its periphery, a nut engaging said threads, and means for preventing axial movement of said nut.

3. In a bushing, a separable bushing tapered externally and provided with a series of longitudinal grooves extending from the interior toward its periphery, a separable sleeve tapered internally and mounted upon said bushing, means for holding the parts of said sleeve about the bushing, and means for causing a relative axial movement between said bushing and sleeve.

4. In a bearing, a separable bushing tapered externally and having a series of longitudinal grooves extending from the interior toward its periphery, an internally-tapered separable sleeve mounted upon said bushing and provided with a series of threads on its periphery, a separable nut adapted to engage said threads and provided with means for holding the parts thereof about the sleeve, and means for preventing an axial movement of said nut.

ELMER E. RUEF.

Witnesses:
WILLIAM M. TAYLOR,
ARTHUR M. HOOD.